United States Patent
Wilcock et al.

(10) Patent No.: US 7,477,903 B2
(45) Date of Patent: Jan. 13, 2009

(54) OBTAINING LOCATION UPDATES ABOUT A MOBILE ENTITY FOR USE IN A LOCATION-SENSITIVE APPLICATION

(75) Inventors: Lawrence Wilcock, Malmesbury (GB); Rycharde Jeffery Hawkes, Bristol (GB); Michael P Spratt, Bath (GB); Simon Edwin Crouch, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1416 days.

(21) Appl. No.: 09/858,146

(22) Filed: May 15, 2001

(65) Prior Publication Data

US 2002/0013153 A1 Jan. 31, 2002

(30) Foreign Application Priority Data

May 20, 2000 (GB) ................................. 0012143.4

(51) Int. Cl.
*H04Q 7/20* (2006.01)
(52) U.S. Cl. ............... 455/456.1; 455/456.3; 455/404.2; 455/414.2; 340/988; 340/992; 340/995.25; 701/213; 701/214
(58) Field of Classification Search ............. 455/456.1, 455/456.3, 456.6, 457, 404.1, 414.2; 340/988, 340/989, 991–993, 995.25; 701/200, 213, 701/214
See application file for complete search history.

(56) References Cited

U.S. PATENT DOCUMENTS

| | | | |
|---|---|---|---|
| 5,329,576 A * | 7/1994 | Handforth | 455/410 |
| 5,375,161 A | 12/1994 | Fuller et al. | 379/57 |
| 5,432,841 A * | 7/1995 | Rimer | 455/457 |
| 5,432,842 A | 7/1995 | Kinoshita et al. | 379/60 |
| 5,532,690 A | 7/1996 | Hertel | 340/989 |
| 5,555,376 A | 9/1996 | Theimer et al. | 395/200.09 |
| 5,561,704 A | 10/1996 | Salimando | 379/58 |
| 5,598,166 A | 1/1997 | Ishikawa et al. | 342/357 |
| 5,724,660 A | 3/1998 | Kauser et al. | 455/456 |
| 5,774,829 A * | 6/1998 | Cisneros et al. | 701/213 |
| 5,790,074 A | 8/1998 | Rangedahl et al. | 342/357 |
| 5,850,609 A | 12/1998 | Sugarbroad et al. | 455/456 |
| 5,922,073 A | 7/1999 | Shimada | 713/200 |
| 5,999,126 A | 12/1999 | Ito | 342/357.1 |
| 6,011,973 A | 1/2000 | Valentine et al. | 455/456 |
| 6,055,434 A | 4/2000 | Seraj | 455/456 |
| 6,067,007 A | 5/2000 | Gioia | 340/426 |
| 6,119,012 A * | 9/2000 | Amirijoo | 455/456.1 |
| 6,167,274 A | 12/2000 | Smith | 455/456 |
| 6,173,180 B1 | 1/2001 | Hussain et al. | 455/433 |
| 6,211,818 B1 | 4/2001 | Zach, Sr. | 342/357.07 |

(Continued)

FOREIGN PATENT DOCUMENTS

CA 2255349 6/1999

(Continued)

*Primary Examiner*—Sujatha Sharma

(57) ABSTRACT

Location data about a mobile entity (70) is periodically provided to a location-sensitive application, for example, a route-tracking application. The location data is updated at a frequency that is adaptively varied in dependence on the provision of location data about the mobile entity from other sources (45). The update frequency can also be made dependent on further factors such as: the motion of the mobile entity("V"), the current environment of the mobile entity ("E"), and the progress of the location-sensitive application ("Z").

19 Claims, 4 Drawing Sheets

U.S. PATENT DOCUMENTS

| | | | |
|---|---|---|---|
| 6,223,044 B1 * | 4/2001 | Schultz | 455/456.1 |
| 6,249,245 B1 * | 6/2001 | Watters et al. | 342/357.03 |
| 6,275,707 B1 | 8/2001 | Reed et al. | 455/456 |
| 6,356,761 B1 | 3/2002 | Huttunen et al. | 455/456 |
| 6,370,629 B1 | 4/2002 | Hastings et al. | 711/163 |
| 6,377,791 B1 * | 4/2002 | Pirila | 455/410 |
| 6,415,155 B1 | 7/2002 | Koshima et al. | 455/456 |
| 6,456,852 B2 | 9/2002 | Bar et al. | 455/456 |
| 6,462,656 B2 | 10/2002 | Ulrich et al. | 340/539 |
| 6,466,938 B1 | 10/2002 | Goldberg | 707/100 |
| 6,538,601 B2 * | 3/2003 | Bruno et al. | 342/357.1 |
| 6,539,200 B1 * | 3/2003 | Schiff | 455/12.1 |
| 6,549,625 B1 | 4/2003 | Rautila et al. | 380/258 |
| 6,594,666 B1 | 7/2003 | Biswas et al. | 707/100 |
| 6,603,977 B1 | 8/2003 | Walsh et al. | 455/456 |
| 6,624,754 B1 | 9/2003 | Hoffman et al. | 340/573.1 |
| 6,625,457 B1 * | 9/2003 | Raith | 455/456.1 |
| 6,633,877 B1 | 10/2003 | Saigh et al. | 707/10 |
| 6,636,742 B1 * | 10/2003 | Torkki et al. | 455/456.1 |
| 6,636,894 B1 | 10/2003 | Short et al. | 709/225 |
| 6,650,284 B1 * | 11/2003 | Mannings et al. | 342/357.09 |
| 6,662,108 B2 * | 12/2003 | Miller et al. | 701/301 |
| 6,675,014 B1 * | 1/2004 | Sundquist | 455/435.1 |
| 6,677,894 B2 | 1/2004 | Sheynblat et al. | 342/357.1 |
| 6,748,226 B1 * | 6/2004 | Wortham | 455/456.6 |
| 6,748,318 B1 * | 6/2004 | Jones | 701/201 |
| 6,853,848 B2 * | 2/2005 | Sahinoglu | 455/456.1 |
| 6,856,807 B1 * | 2/2005 | Raith | 455/456.1 |
| 2001/0055976 A1 | 12/2001 | Crouch et al. | 455/456 |
| 2002/0004412 A1 | 1/2002 | Waters | 455/556 |
| 2002/0055361 A1 | 5/2002 | McDonnell et al. | 455/456 |
| 2002/0120394 A1 * | 8/2002 | Rayne | 701/207 |

FOREIGN PATENT DOCUMENTS

| | | |
|---|---|---|
| EP | 0 703 463 A2 | 3/1996 |
| EP | 0 785 535 A1 | 7/1997 |
| EP | 0 874 529 A2 | 10/1998 |
| EP | 0 973 351 A1 | 1/2000 |
| GB | 2 305 285 | 4/1997 |
| GB | 2 325 592 A | 11/1998 |
| GB | 2 334 859 A | 9/1999 |
| GB | 2339356 A | 1/2000 |
| GB | 2 348 573 A | 10/2000 |
| JP | 10103977 | 4/1998 |
| JP | 11027733 | 1/1999 |
| JP | 2001133534 * | 5/2001 |
| WO | 94/26567 | 11/1994 |
| WO | WO 98/25433 | 6/1998 |
| WO | WO 98/52379 | 11/1998 |
| WO | WO 98/57506 | 12/1998 |
| WO | WO 98/59506 | 12/1998 |
| WO | WO 00/19743 | 4/2000 |
| WO | WO 00/30379 | 5/2000 |

* cited by examiner

OBTAINING LOCATION UPDATES ABOUT A MOBILE ENTITY FOR USE IN A LOCATION-SENSITIVE APPLICATION

CROSS-REFERENCE TO RELATED APPLICATIONS

This application is related to U.S. Patent Application Ser.No. 09/862,185 filed on May 21, 2001 for "Finding Locally-Relevant Information In a Document". This application is also related to U.S. Patent Application Ser. No. 09/858,148 filed on May 15, 2001 for "Retrieval of Location-Related Information.

FIELD OF THE INVENTION

The present invention relates to a method and apparatus for obtaining location updates about a mobile entity for use in a location-sensitive application.

BACKGROUND OF THE INVENTION

Communication infrastructures suitable for mobile users (in particular, though not exclusively, cellular radio infrastructures) have now become widely adopted. Whilst the primary driver has been mobile telephony, the desire to implement mobile data-based services over these infrastructures, has led to the rapid development of data-capable bearer services across such infrastructures. This has opened up the possibility of many Internet-based services being available to mobile users.

By way of example, FIG. 1 shows one form of known communication infrastructure for mobile users providing both telephony and data-bearer services. In this example, a mobile entity 20, provided with a radio subsystem 22 and a phone subsystem 23, communicates with the fixed infrastructure of GSM PLMN (Public Land Mobile Network) 10 to provide basic voice telephony services. In addition, the mobile entity 20 includes a data-handling subsystem 25 interworking, via data interface 24, with the radio subsystem 22 for the transmission and reception of data over a data-capable bearer service provided by the PLMN; the data-capable bearer service enables the mobile entity 20 to communicate with a service system 40 connected to the public Internet 39. The data handling subsystem 25 supports an operating environment 26 in which applications run, the operating environment including an appropriate communications stack.

More particularly, the fixed infrastructure 10 of the GSM PLMN comprises one or more Base Station Subsystems (BSS) 11 and a Network and Switching Subsystem NSS 12. Each BSS 11 comprises a Base Station Controller (BSC) 14 controlling multiple Base Transceiver Stations (BTS) 13 each associated with a respective "cell" of the radio network. When active, the radio subsystem 22 of the mobile entity 20 communicates via a radio link with the BTS 13 of the cell in which the mobile entity is currently located. As regards the NSS 12, this comprises one or more Mobile Switching Centers (MSC) 15 together with other elements such as Visitor Location Registers 32 and Home Location Register 32.

When the mobile entity 20 is used to make a normal telephone call, a traffic circuit for carrying digitised voice is set up through the relevant BSS 11 to the NSS 12 which is then responsible for routing the call to the target phone (whether in the same PLMN or in another network).

With respect to data transmission to/from the mobile entity 20, in the present example three different data-capable bearer services are depicted though other possibilities exist. A first data-capable bearer service is available in the form of a Circuit Switched Data (CSD) service; in this case a full traffic circuit is used for carrying data and the MSC 32 routes the circuit to an InterWorking Function IWF 34 the precise nature of which depends on what is connected to the other side of the IWF. Thus, IWF could be configured to provide direct access to the public Internet 39 (that is, provide functionality similar to an IAP—Internet Access Provider IAP). Alternatively, the IWF could simply be a modem connecting to a PSTN; in this case, Internet access can be achieved by connection across the PSTN to a standard IAP.

A second, low bandwidth, data-capable bearer service is available through use of the Short Message Service that passes data carried in signalling channel slots to an SMS unit which can be arranged to provide connectivity to the public Internet 39.

A third data-capable bearer service is provided in the form of GPRS (General Packet Radio Service which enables IP (or X.25) packet data to be passed from the data handling system of the mobile entity 20, via the data interface 24, radio subsystem 21 and relevant BSS 11, to a GPRS network 17 of the PLMN 10 (and vice versa). The GPRS network 17 includes a SGSN (Serving GPRS Support Node) 18 interfacing BSC 14 with the network 17, and a GGSN (Gateway GPRS Support Node) interfacing the network 17 with an external network (in this example, the public Internet 39). Full details of GPRS can be found in the ETSI (European Telecommunications Standards Institute) GSM 03.60 specification. Using GPRS, the mobile entity 20 can exchange packet data via the BSS 11 and GPRS network 17 with entities connected to the public Internet 39.

The data connection between the PLMN 10 and the Internet 39 will generally be through a firewall 35 with proxy and/or gateway functionality.

Different data-capable bearer services to those described above may be provided, the described services being simply examples of what is possible.

In FIG. 1, a service system 40 is shown connected to the Internet 40, this service system being accessible to the OS/application 26 running in the mobile entity by use of any of the data-capable bearer services described above. The data-capable bearer services could equally provide access to a service system that is within the domain of the PLMN operator or is connected to another public or private data network.

With regard to the OS/application software 26 running in the data handling subsystem 25 of the mobile entity 20, this could, for example, be a WAP application running on top of a WAP stack where "WAP" is the Wireless Application Protocol standard. Details of WAP can be found, for example, in the book "Official Wireless Application Protocol" Wireless Application Protocol Forum, Ltd published 1999 Wiley Computer Publishing. Where the OS/application software is WAP compliant, the firewall will generally also serve as a WAP proxy and gateway. Of course, OS/application 26 can comprise other functionality (for example, an e-mail client) instead of, or additional to, the WAP functionality.

The mobile entity 20 may take many different forms. For example, it could be two separate units such as a mobile phone (providing elements 22-24) and a mobile PC (data-handling system 25) coupled by an appropriate link (wireline, infrared or even short range radio system such as Bluetooth). Alternatively, mobile entity 20 could be a single unit such as a mobile phone with WAP functionality. Of course, if only data transmission/reception is required (and not voice), the phone functionality 24 can be omitted; an example of this is a PDA with built-in GSM data-capable functionality whilst another example is a digital camera (the data-handling subsystem) also with built-in GSM data-capable functionality enabling the upload of digital images from the camera to a storage server.

Whilst the above description has been given with reference to a PLMN based on GSM technology, it will be appreciated that many other cellular radio technologies exist and can typically provide the same type of functionality as described for the GSM PLMN 10.

Recently, much interest has been shown in "location-based", "location-sensitive", "location-dependent", or "location-aware" services (also called applications) for mobile users, these being services that take account of the current location of the user (or other mobile party). The most basic form of this service is the emergency location service whereby a user in trouble can press a panic button on their mobile phone to send an emergency request-for-assistance message with their location data appended. Another well known location-based service is the provision of traffic and route-guiding information to vehicle drivers based on their current position. A further known service is a "yellow pages" service where a user can find out about amenities (shops, restaurants, theatres, etc.) local to their current location. The terms "location-aware services" or "location-sensitive applications" will be used herein to refer generically to these and similar services/applications where a location dependency exists.

Location-aware services all require user location as an input parameter. A number of methods already exist for determining the location of a mobile user as represented by an associated mobile equipment. Example location-determining methods will now be described with reference to FIGS. 2 to 4. As will be seen, some of these methods result in the user knowing their location thereby enabling them to transmit it to a location-aware service they are interested in receiving, whilst other of the methods result in the user's location becoming known to a network entity from where it can be supplied directly to a location-aware service (generally only with the consent of the user concerned). It is to be understood that additional methods to those illustrated in FIGS. 2 to 4 exist.

As well as location determination, FIGS. 2 to 4 also illustrate how the mobile entity requests a location-aware service provided by service system 40. In the present examples, the request is depicted as being passed over a cellular mobile network (PLMN 10) to the service system 40. The PLMN is, for example, similar to that depicted in FIG. 1 with the service request being made using a data-capable bearer service of the PLMN. The service system 40 may be part of the PLMN itself or connected to it through a data network such as the public Internet. It should, however, be understood that infrastructure other than a cellular network may alternatively be used for making the service request FIG. 2 shows two different location-determining methods both involving the use of local, fixed-position, beacons here shown as infra-red beacons IRD though other technologies, such as short-range radio systems (in particular, "Bluetooth" systems) may equally be used. The right hand half of FIG. 2 show a number of independent beacons 55 that continually transmit their individual locations. Mobile entity 20B is arranged to pick up the transmissions from a beacon when sufficiently close, thereby establishing its position to the accuracy of its range of reception. This location data can then be appended to a request 59 made by the mobile entity 20B to a location-aware service available from service system 40. A variation on this arrangement is for the beacons 55 to transmit information which whilst not directly location data, can be used to look up such data (for example, the data maybe the Internet home page URL of a store housing the beacon 55 concerned, this home page giving the store location—or at least identity, thereby enabling look-up of location in a directory service).

In the left-hand half of FIG. 2, the IRB beacons 54 are all connected to a network that connects to a location server 57. The beacons 54 transmit a presence signal and when mobile entity 20C is sufficiently close to a beacon to pick up the presence signal, it responds by sending its identity to the beacon. (Thus, in this embodiment, both the beacons 54 and mobile entity 20C can both receive and transmit IR signals whereas beacons 55 only transmit, and mobile entity 20B only receives, IR signals). Upon a beacon 54 receiving a mobile entity's identity, it sends out a message over network 56 to location server 57, this message linking the identity of the mobile entity 20C to the location of the relevant beacon 54. Now when the mobile entity wishes to invoke a location-aware service provided by the service system 40, since it does not know its location it must include it's identity in the service request 58 and rely on the service system 40 to look up the current location of the mobile entity in the location server 57. Because location data is personal and potentially very sensitive, the location server 57 will generally only supply location data to the service system 40 after the latter has produced an authorizing token supplied by the mobile entity 20B in request 58. It will be appreciated that whilst service system 40 is depicted as handling service requests form both types of mobile entity 20 B and 20C, separate systems 40 may be provided for each mobile type (this is likewise true in respect of the service systems depicted in FIGS. 3 and 4).

FIG. 3 depicts several forms of GPS location-determining system. On the left-hand side of FIG. 3, a mobile entity 20D is provided with a standard GPS module and is capable of determining the location of entity 20D by picking up signals from satellites 60. The entity 20D can then supply this location when requesting, in request 61, a location-aware service from service system 40.

The right-hand side of FIG. 3 depicts, in relation to mobile entity 20E, two ways in which assistance can be provided to the entity in deriving location from GPS satellites. Firstly, the PLMN 10 can be provided with fixed GPS receivers 62 that each continuously keep track of the satellites 60 visible from the receiver and pass information in messages 63 to local mobile entities 20E as to where to look for these satellites and estimated signal arrival times; this enables the mobile entities 20E to substantially reduce acquisition time for the satellites and increase accuracy of measurement (see "Geolocation Technology Pinpoints Wireless 911 calls within 15 Feet" Jul. 1, 1999 Lucent Technologies, Bell Labs). Secondly, as an alternative enhancement, the processing load on the mobile entity 20E can be reduced and encoded jitter removed using the services of network entity 64 (in or accessible through PLMN 10).

One the mobile unit 20E has determined its location, it can pass this information in request 65 when invoking a location-aware service provided by service system 40.

FIG. 4 depicts two general approaches to location determination from signals present in a cellular radio infrastructure. First, it can be noted that in general both the mobile entity and the network will know the identity of the cell in which the mobile entity currently resides, this information being provided as part of the normal operation of the system. (Although in a system such as GSM, the network may only store current location to a resolution of a collection of cells known as a "location area", the actual current cell ID will generally be derivable from monitoring the signals exchanged between the BSC 14 and the mobile entity). Beyond current basic cell ID, it is possible to get a more accurate fix by measuring timing and/or directional parameters between the mobile entity and multiple BTSs 13, these measurement being done either in the network or the mobile entity (see, for example, International Application WO 99/04582 that describes various techniques for effecting location determination in the mobile and WO 99/55114 that describes location determination by the mobile network in response to requests made by location-aware applications to a mobile location center- server- of the mobile network).

The left-hand half of FIG. 4 depicts the case of location determination being done in the mobile entity 20F by, for example, making Observed Time Difference (OTD) measurements with respect to signals from BTSs 13 and calculating location using a knowledge of BTS locations. The location data is subsequently appended to a service request 66 sent to service system 40 in respect of a location-aware service. The calculation load on mobile entity 20F could be reduced and the need for the mobile to know BTS locations avoided, by having a network entity do some of the work. The right-hand half of FIG. 5 depicts the case of location determination being done in the network, for example, by making Timing Advance measurements for three BTSs 13 and using these measurements to derive location (this derivation typically being done in a unit associated with BSC 14). The resultant location data is passed to a location server 67 from where it can be made available to authorised services. As for the mobile entity 20C in FIG. 2, when the mobile entity 20G of FIG. 4 wishes to invoke a location-aware service available on service system 50, it sends a request 69 including an authorisation token and its ID (possible embedded in the token) to the service system 40; the service system then uses the authorisation token to obtain the current location of the mobile entity 20G from the location server 67.

In the above examples, where the mobile entity is responsible for determining location, this will generally be done only at the time the location-aware service is being requested. Where location determination is done by the infrastructure, it may be practical for systems covering only a limited number of users (such as the system illustrated in the left-hand half of FIG. 2 where a number of infrared beacons 54 will cover a generally fairly limited) for location-data collection to be done whenever a mobile entity is newly detected by an IRB, this data being passed to location server 57 where it is cached for use when needed. However, for systems covering large areas with potentially a large number of mobile entities, such as the FIG. 4 system, it is more efficient to effect location determination as and when there is a perceived need to do so; thus, location determination may be triggered by the location server 67 in response to the service request 68 from the mobile entity 20G or the mobile entity may, immediately prior to making request 68, directly trigger BSC 14 to effect a location determination and feed the result to location server 67.

Further with respect to the location servers 57, 67, whilst access authorisation by location-aware services has been described as being through authorisation tokens supplied by the mobile entities concerned, other authorisation techniques can be used. In particular, a location-aware service can be prior authorised with the location server in respect of particular mobile entities; in this case, each request from the service for location data needs only to establish that the request comes from a service authorised in respect of the mobile entity for which the location data is requested.

As already indicated, FIGS. 2 to 4 depict only some examples of how location determination can be achieved, there being many other possible combinations of technology used and where in the system the location-determining measurements are made and location is calculated, stored and used. Thus, the location-aware service may reside in the mobile entity whose location is of interest, in a network-connected service system 40 (as illustrated), or even in another mobile entity. Furthermore, whilst in the examples of FIGS. 2 to 4, invocation of the location-aware service has been by the mobile entity whose location is of interest, the nature of the location-aware service may be such that it is invoked by another party (including, potentially, the PLMN itself). In this case, unless the invoking party already knows the location of he mobile entity and can pass this information to the location-aware service (which may, for example, maybe situation where the PLMN invokes the service), it is the location-aware service that is responsible for obtaining the required location data, either by sending a request to the mobile entity itself or by requesting the data from a location server. Unless the location server already has the needed information in cache, the server proceeds to obtain the data either by interrogating the mobile entity or by triggering infrastructure elements to locate the mobile. For example, where a location-aware service running on service system 40 in FIG. 4 needs to find the location of mobile 20G, it could be arranged to do so by requesting this information from location server 67 which in turn requests the location data from the relevant BSC, the latter then making the necessary determination using measurements from BTSs 13.

Although in the foregoing, the provision of location data through the mobile radio infrastructure to the mobile entity has been treated as a service effected over a data-capable bearer channel, it may be expected that as location data becomes considered a basic element of mobile radio infrastructure services, provision will be made in the relevant mobile radio standards for location data to be passed over a signalling channel to the mobile entity.

Whatever method is used for obtaining location data, this data comes at a cost, whether direct or indirect. For example, if a mobile entity is equipped with a GPS system, then the cost is apparent in the additional cost of the equipment; where the mobile entity is powered from an internal battery, there will also an additional cost of concern in terms of the drain on the battery each time a location fix is obtained. Where location data is obtained from a location server associated with a cellular radio infrastructure, then the mobile user is likely to be billed for each location update (or series of updates) in order to compensate the PLMN operator for the cost of the infrastructure equipment and usage needed to provide the location data.

It is an object of the present invention to reduce the recurring costs involved in providing location data to a location-sensitive application.

SUMMARY OF THE INVENTION

According to one aspect of the present invention, there is provided a method of obtaining location data about a mobile entity for provision to a location-sensitive application, wherein location updates are periodically obtained from a source of location data about the mobile entity with the interval between updates being adaptively varied in dependence the provision of location data about the mobile entity from at least one other source of location data.

According to another aspect of the present invention, there is provided apparatus for obtaining location data about a mobile entity for provision to a location-sensitive application, the apparatus comprising:

a first location-data receiving arrangement operative to periodically obtain location updates from a first source of location data about the mobile entity; and a second location-data receiving location data about the mobile entity from at least one other source of location data;

the first location-data arrangement including an update-interval control for adaptively varying the interval between location updates obtained from the first source in dependence on the receipt of location data by the second location-data receiving arrangement.

BRIEF DESCRIPTION OF THE DRAWINGS

A method and apparatus, both embodying the present invention, for periodically obtaining location data about a mobile entity, will now be described, by way of non-limiting example, with reference to the accompanying diagrammatic drawings, in which.

BEST MODE OF CARRYING OUT THE INVENTION

Figure 1:
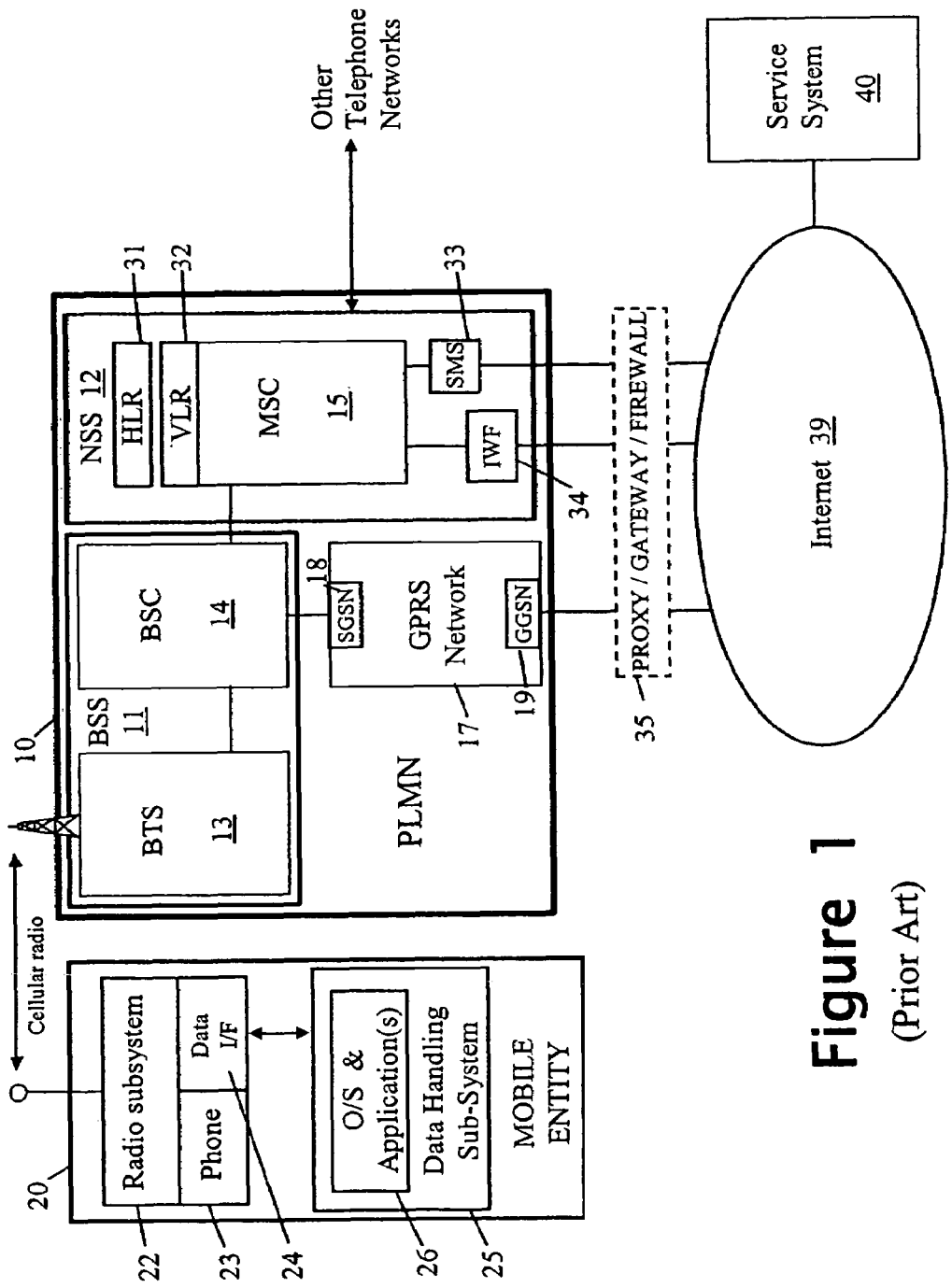
FIG. 1 is a diagram of a known communications infrastructure usable for transferring voice and data to/from a mobile entity.
Figure 2:
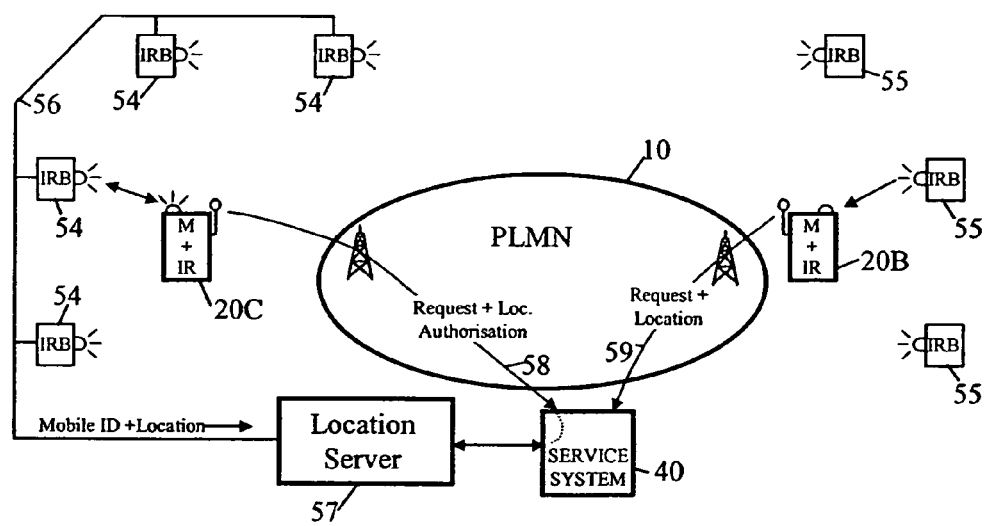
FIG. 2 is a diagram illustrating one known approach to determining the location of a mobile entity, this approach being based on proximity of the mobile entity to fixed-position local beacons.
Figure 3:
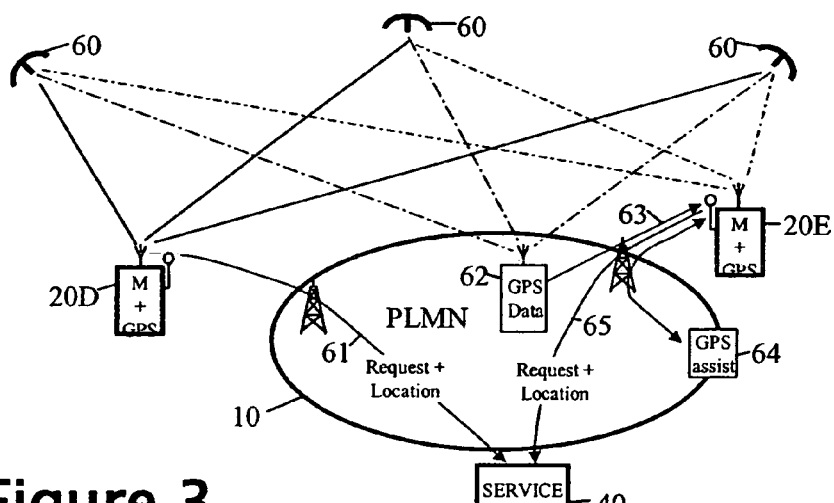
FIG. 3 is a diagram illustrating a further known approach to determining the location of a mobile entity, this approach involving the use of GPS satellites.
Figure 5:
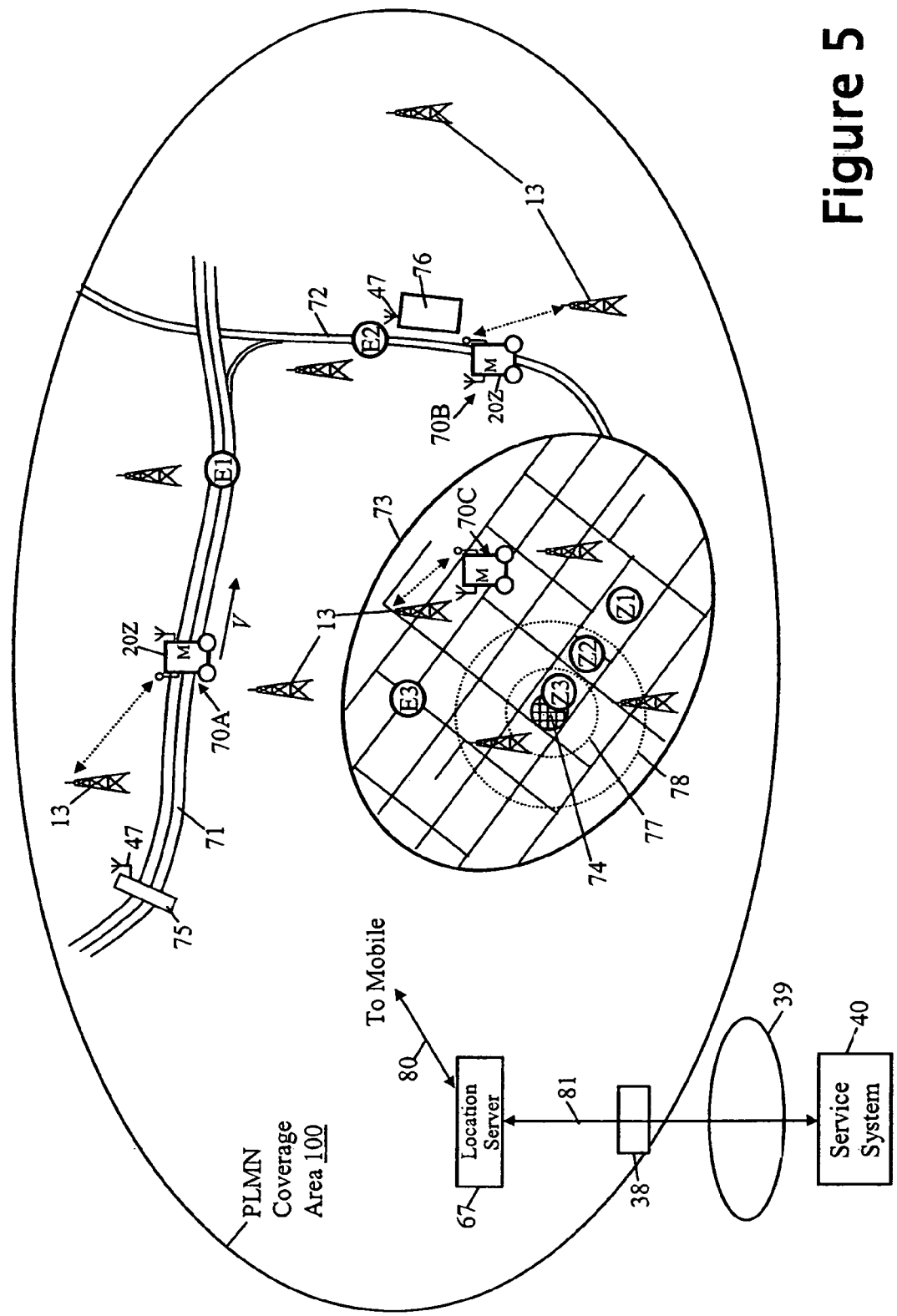
FIG. 5 is a diagram illustrating the movement around an environment of a vehicle equipped with apparatus embodying the present invention.

The method and apparatus embodying the invention, for periodically obtaining location data about a mobile entity, will now be described with reference to FIGS. 5 and 6. It is to be understood that the present invention is not limited to the specifics of the mobile entity, communication infrastructure, and location discovery means shown in FIGS. 5 and 6 and the generalisations discussed above in relation to FIG. 1 regarding these elements apply equally to the operational context of the embodiment of the invention described below. Furthermore, whilst the described embodiment involves a location-sensitive application run in a vehicle carrying the mobile entity, the present invention is also applicable to situations where the location-sensitive application is run in a separate service system 40, as is also illustrated in FIG. 5. In this case, it will be appreciated that whilst the service system 40 is shown in FIG. 5 as being connected to the public Internet, it could equally be connected to another network through which it can be supplied with location data about the mobile entity (for example, to a GPRS network 17 of PLMN 10 or to another fixed data network interfacing directly or indirectly with the network 17 or network 39).

Figure 4:
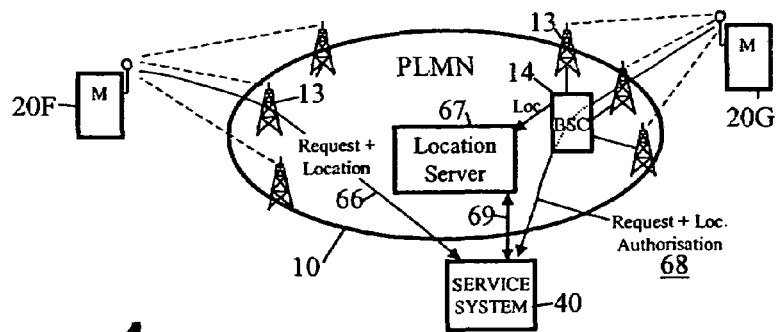
FIG. 4 is a diagram illustrating a still further approach to determining the location of a mobile entity, this approach being based on the use of signals present in a cellular mobile radio communications system.

FIG. 5 depicts a region within coverage area 100 of a PLMN 10 with base station transceivers 13 (only some of which are shown) and a location server 67 such as described above in relation to FIG. 4. The region includes three different driving environments, namely a motorway/freeway/autoroute environment designated E1 and represented by motorway 71, a country road environment designated E2 and represented byroad 72, and an urban environment designated E3 within city limits 73. A vehicle 70 is shown at three positions on its way to a target destination 74 in the urban environment. Thus, in a first position the vehicle, designated 70A, is travelling along motorway 71; in its second position the vehicle, designated 70B, is travelling along country road 72; and in its third position the vehicle, designated 70C, is travelling in the urban environment.

Figure 6:
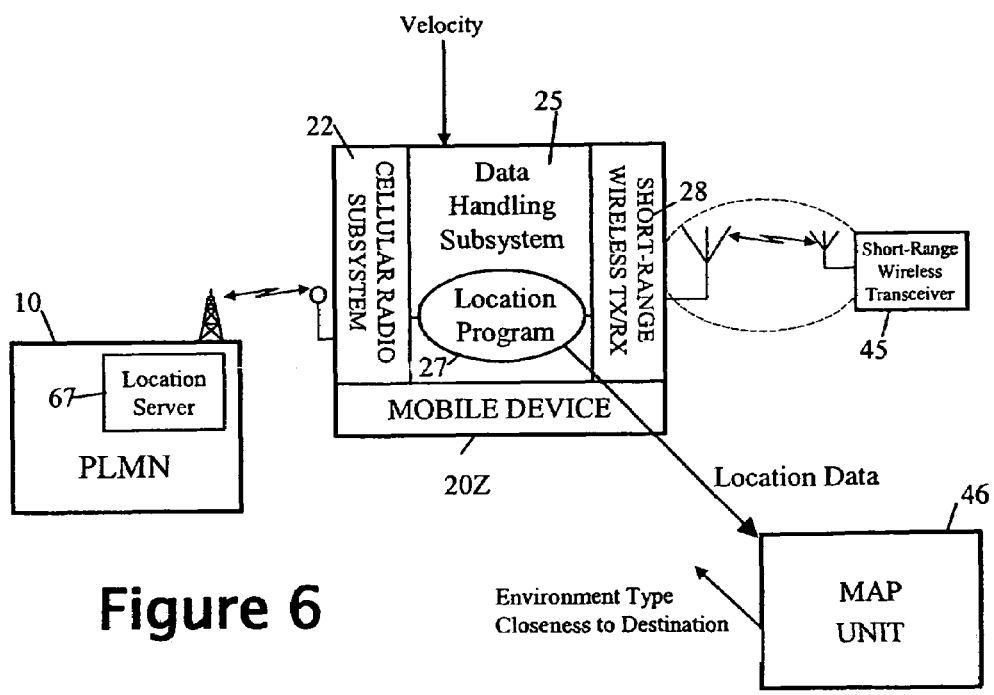
FIG. 6 is a diagram showing the apparatus with which the FIG. 5 vehicle is equipped.

Vehicle 70 is equipped with a mobile entity 20Z shown in FIG. 6. The mobile entity 20Z comprises the following three main subsystems:

a short-range wireless transceiver subsystem 21 for communicating with other shortrange wireless transceivers 45 (in the present example, the short-range system is a Bluetooth radio system but other short-range technologies, including infra-red could alternatively be used). The subsystem 21 is capable of picking up location data transmitted by fixed Bluetooth-based location beacons, such as beacons 47 in FIG. 5, one such beacon being provided at a motorway toll both 75 and another at filling station 76 on country road 72.

a cellular radio subsystem 22 capable of requesting and receiving location data about itself from location server 67 over a data-capable bearer service of PLMN 10.

a data-handling subsystem 25 that interfaces with both the short-range wireless transceiver subsystem 21 and the cellular radio subsystem 22 via appropriate interfaces. The data-handling subsystem 25, when so instructed, runs a location program 27 for periodically obtaining location data from location server 67 and passing it to a map unit 46 that tracks the progress of the unit towards a target destination giving route instructions along the way (such units are well known in the art and will not be described further herein).

The data-handling subsystem 25 will generally be integrated with the other subsystems 21 and 22 into a single device; however, it would be possible to provide the subsystems in two or more separate physical elements appropriately linked together to operate as a single device.

The location program 27, in providing location updates to the map unit 46 during the course of a journey undertaken by vehicle 70, is operative to adaptively vary the interval between obtaining location updates from the location server 67 in dependence upon the following factors:

(a) The motion of the vehicle and in particular, in the present example, its velocity V (velocity information can be provided from an appropriate vehicle source or can be determined by the location program on the basis of change in location during the time between the last two location fixes). As vehicle velocity increases, it is sensible to generally reduce the interval between location updates in order to maintain the same approximate degree of location accuracy.

(b) The expected steadiness of progression of the vehicle having regard to the current driving environment E. In the present case, three different environments are possible, namely:

motorway environment E1 where the vehicle can be expected to make steady progress so that the interval between location updates can be increased, dead reckoning then being used to provide a reasonably accurate estimate of the vehicle's current position;

country road environment E2 where the vehicle's progress is less predictable than on the motorway but nevertheless likely to be reasonably even and therefore requiring only an average interval between location updates;

urban environment E3 where the vehicle's progress is least predictable of all so that a small interval between location updates is needed, this also being occasioned by the close proximity of junctions to one another.

The current environment of the vehicle (E1, E2 or E3) is provided to the location program 27 from the map unit 46 on the basis of the vehicle's current position, the environment zones being recorded on the map data held by map unit 46.

(c) The progress of the location-sensitive application—in this case, the route tracking application run by map unit 46 with the progress of the application being the perceived proximity Z of the vehicle to the target destination 74 set in by the vehicle user. Thus, the application is pre-programmed to recognise three target proximity zones Z1, Z2 and Z3 with zone Z1 being farthest from the target destination and zone Z3 closest. The interval between location updates is needed to be smallest as the vehicle approaches the destination since this is when the user most needs accurate current location data. The current proximity zone is supplied to the location program 27 by the map unit 46.

(d) The availability of location data from a different source, such as location beacons 47—in this case, the location program 27 can increase the interval before when it next requests a location update from the location server 67, the location data received from the alternative source being passed to the map unit 46. The likely accuracy of the location data received from the alternative source also needs to be considered since, if highly inaccurate, it would be better to ignore it—location data from location beacons, such as beacons 47, is however, likely to be very accurate.

The location program 27 is, for example, initiated by the map unit 46 upon the user setting in a target destination into the unit 46. The location program after obtaining an initial location fix from the location server 47, then starts to time an interval to when it should next obtain a location from the location server. If during this interval, location data is obtained through the short-range wireless subsystem 28, for example, from a beacon 47 passed by vehicle 70, that location data is forwarded to the map unit 46 and the timing of the interval to the next location request is re-initiated. The duration of this interval is set in dependence on factors (a), (b) and (c) above according to the following formula:

$$\text{Interval} = K_A[E/(V.Z)]$$

where:

E is a measure of the current driving environment and has its highest value for environment E1 and lowest value for environment E3;

V is the vehicle's velocity;

Z is a measure of the proximity zone and has its highest value for the closest zone Z3 and lowest value for the most remote zone Z1;

$K_A$ is a constant (which can have different values depending on the precise location-sensitive application concerned).

More refined versions of the above formula are, of course, possible; however, the above version illustrates the general relationship between update interval and dependency factors.

As will be appreciated by persons skilled in the art, it may be desirable to make certain conditions paramount—for example, where the vehicle is detected as being in zone Z3 (factor c) then the update interval might be set to a minimum regardless of the value of the other factors (a, b, and d).

Furthermore, it is not necessary to use all three of the above factors "a", "b", "c" and any one factor or any combination of two factors could be used for controlling the interval between location updates. Additional factors could also be introduced, such as accuracy of intervening location updates from secondary location sources, weather conditions, vehicle acceleration (in fact, this is really just an aspect of the motion factor "a"), mode of transport being used (for example, if the user is actually walking, then the value of at least the constant $K_A$ would be changed—increased—to substantially increase the interval between updates), etc.

In the foregoing example, the location program 27 and location-sensitive application (map unit 46) resided in the vehicle 70. FIG. 5 also depicts an alternative arrangement in which both the program 27 and application 46 reside at service system 40 (as may be useful to a fleet operators wanting to keep track of their vehicles). The service system 40 is connected to the location server 67 of PLMN 10 via the internet 39 thereby enabling the location program 27 (now located at system 40) to obtain location updates in respect of vehicle 70 (assuming the latter remains equipped with mobile entity 20Z and further assuming that the service system has authority to access the location server 67 for location data on the mobile entity 20Z). In this embodiment, the mobile entity 20Z is responsible for making available to the service system (via a data-capable bearer service of PLMN 10 and the internet 39) location data picked up from other sources, in particular, beacons 47. As for the other factors used to determine the interval between location updates, factors "b" and "c" (driving environment, destination proximity zone) are provided by the map unit 46 and therefore remain readily available to the location program 27; furthermore, vehicle velocity (factor "a") can be derived from location and time data available to the location program.

The adaptive variation of the interval between location updates enables the number of such updates to be minimised without prejudicing the performance of the location-sensitive application concerned.

It will be appreciated that whilst route tracking is a primary example of a location-sensitive application in respect of which the present invention can be deployed, other uses are possible including a simple location logging application and providing on-going estimates for the time of arrival of a public transport vehicle.

As already indicated, the accuracy of location data derived from the secondary sources (e.g. beacons 47) can be used to determine whether or not to use the data and, if used, to set the interval to the next location update from the main location data source. The accuracy of the location data from secondary sources can be judged by the type of secondary source concerned (for example, static short-range location beacons are likely to be highly accurate), this type information generally being implicit in the method used by the mobile entity to pick up the location data from the secondary source. Alternatively, the type of the secondary location data source can be transmitted to the mobile entity along with the location data from the source; indeed, the accuracy of the transmitted location data could be included with the location data.

What is claimed is:

1. A method of obtaining location data about a mobile entity for provision to a location-sensitive application, the method comprising:

periodically obtaining location updates indicative of the current location of the mobile entity from a first source of location data; and extending the interval between the location updates from said first source when location data indicative of the current location of the mobile entity is available from at least one other source of location data that operates independently of said first source and the location updates provided thereby.

2. A method according to claim 1, wherein the first source of location data derives location data from a cellular radio network, said at least one other source of location data being short-range location beacons, the interval between updates from the first source being extended upon location data being received from a said location beacon.

3. A method according to claim 1, wherein the interval between location updates from the first source is dependent on the accuracy of the location data received from said at least one other source of location data.

4. A method according to claim 3, wherein the accuracy of location data received from a said other location data source is determined according to the nature of said other source of location data.

5. A method according to claim 3, wherein the accuracy of location data received from a said other location data source is explicitly provided along with that location data.

6. A method according to claim 1, wherein the adaptive variation of the interval between updates is further dependent at least on the motion of the mobile entity.

7. A method according to claim 6, wherein the frequency of updates increases with velocity of the mobile entity.

8. A method according to claim 1, wherein the adaptive variation of the interval between updates is further dependent at least on the current environment of the mobile entity.

9. A method according to claim 8, wherein the frequency of updates is higher in environments where the velocity of the mobile entity is expected to change more often.

10. A method according to claim 9, wherein environment information is derived from a map having regard to the current location of the mobile entity.

11. A method according to claim 1, wherein the adaptive variation of the interval between updates is further dependent at least on the progress of the location-sensitive application.

12. A method according to claim 11, wherein said location-sensitive application involves the approach of the mobile entity to a target location, the frequency of updates being increased the closer the mobile entity approaches the target location.

13. A method according to claim 1, wherein the adaptive variation of the interval between updates is further dependent at least on two of the following: the motion of the mobile entity; the current environment of the mobile entity; the progress of the location-sensitive application.

14. Apparatus for obtaining location data about a mobile entity for provision to a location-sensitive application, the apparatus comprising:

a first locationdata receiving arrangement operative to periodically obtain location updates from a first source of location data about the current location of the mobile entity; and a second location-data receiving arrangement for receiving location data about the current location of the mobile entity from at least one other source of location data that is independent of said first source;

the first location-data arrangement including an update-interval control for extending the interval between location updates obtained from the first source when location data is available from the second location-data receiving arrangement.

15. Apparatus according to claim 14, wherein the first location-data receiving arrangement is operative to obtain location updates from a cellular radio network serving as said first source of location, and the second location-data receiving arrangement is operative to receive location data from short-range location beacons; the update-interval control of the first location-data receiving arrangement being operative to extend the interval between location updates from the first source upon location data being received from a said location beacon by the second location-data receiving arrangement.

16. Apparatus according to claim 14, wherein the update-interval control of the first location-data receiving arrangement is operative to set the interval between location updates from the first source in dependence on the accuracy of location data received from said at least one other source of location data.

17. Apparatus according to claim 16, wherein the update-interval control of the first location-data receiving arrangement is operative to determine the accuracy of location data received from a said other location data source according to the nature of said other source of location data.

18. Apparatus according to claim 16, wherein the update-interval control of the first location-data receiving arrangement is operative to determine the accuracy of location data received from a said other location data source on the basis of accuracy data received along with the location data by said second location-data receiving arrangement.

19. Apparatus according to claim 14, wherein the update-interval control of the first location-data receiving arrangement is further operative to adaptively vary the interval between updates in dependence on at least one of the following:

the motion of the mobile entity;
the current environment of the mobile entity;
the progress of the location-sensitive application.

* * * * *